(12) United States Patent
Constantinescu et al.

(10) Patent No.: US 10,803,018 B2
(45) Date of Patent: Oct. 13, 2020

(54) COMPRESSED DATA REARRANGEMENT TO OPTIMIZE FILE COMPRESSION

(71) Applicant: International Business Machines Corporation, Armonk, NY (US)

(72) Inventors: M. Corneliu Constantinescu, San Jose, CA (US); Leo Shyh-Wei Luan, Saratoga, CA (US); Wayne A. Sawdon, San Jose, CA (US); Frank B. Schmuck, Campbell, CA (US)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 14/970,592

(22) Filed: Dec. 16, 2015

(65) Prior Publication Data

US 2017/0177603 A1      Jun. 22, 2017

(51) Int. Cl.
*G06F 16/174*      (2019.01)
(52) U.S. Cl.
CPC ............................... *G06F 16/1744* (2019.01)
(58) Field of Classification Search
CPC ......... G06F 17/30153; G06F 17/30138; G06F 16/1744
USPC ........................................................... 707/693
See application file for complete search history.

(56) References Cited

U.S. PATENT DOCUMENTS

| | | | |
|---|---|---|---|
| 5,200,864 A | 4/1993 | Dunn et al. | |
| 5,237,675 A | 8/1993 | Hannon, Jr. | |
| 5,627,995 A | 5/1997 | Miller et al. | |
| 5,666,560 A * | 9/1997 | Moertl | G06F 3/0601 710/68 |
| 7,430,638 B2 | 9/2008 | Kellar | |
| 2008/0152235 A1* | 6/2008 | Bashyam | H04N 19/91 382/224 |
| 2009/0216910 A1* | 8/2009 | Duchesneau | G06F 9/5072 709/250 |
| 2010/0228800 A1* | 9/2010 | Aston | G06F 16/1744 707/822 |
| 2011/0252007 A1* | 10/2011 | Cho | G06F 3/0608 707/693 |

(Continued)

OTHER PUBLICATIONS

Waters, "Analysis of Self Indexing, Disc Files," The Computer Journal, vol. 18 No. 3 (1975), pp. 200-205.

(Continued)

*Primary Examiner* — Hosain T Alam
*Assistant Examiner* — Saba Ahmed
(74) *Attorney, Agent, or Firm* — Lieberman & Brandsdorfer, LLC

(57) ABSTRACT

The embodiments described herein relate to managing compressed data to optimize file compression. A first compression is performed on a first set of data to create first compressed data. The first compressed data is stored in one or more blocks of a first compression group. A size of free space of a last block of the first compression group is discovered and calculated. A second compression is performed on a second set of data to create second compressed data. At least a portion of the second compressed data is supplied to the first compression group for padding into the last block in response to determining that the size of the free space is sufficient. An unpadded portion of the second compressed data is stored in one or more blocks of a second compression group.

20 Claims, 8 Drawing Sheets

(56) References Cited

U.S. PATENT DOCUMENTS

| | | | | |
|---|---|---|---|---|
| 2011/0264632 A1* | 10/2011 | Koifman | ............... | G06F 3/0623 |
| | | | | 707/693 |
| 2012/0030408 A1* | 2/2012 | Flynn | .................. | G06F 12/0246 |
| | | | | 711/102 |
| 2012/0151222 A1* | 6/2012 | Koifman | ............. | G06F 12/1408 |
| | | | | 713/189 |
| 2013/0166820 A1* | 6/2013 | Batwara | .............. | G06F 12/0246 |
| | | | | 711/103 |
| 2014/0281167 A1* | 9/2014 | Danilak | ................ | G06F 3/0688 |
| | | | | 711/103 |

OTHER PUBLICATIONS

Lin, "Variable-Sized Object Packing and Its Applications to Instruction Cache Design," Computers and Electrical Engineering, 34 (2008), pp. 438-444.

Li et al., "Performance of Key Features and Interfaces in DryadILINQ CTP," SALSA Group, Pervasive Technology Institute, Indiana University, (Dec. 13, 2011).

* cited by examiner

COMPRESSED DATA REARRANGEMENT TO OPTIMIZE FILE COMPRESSION

BACKGROUND

The embodiments described herein relate to data compression. More specifically, the embodiments relate to arranging compressed data to optimize file compression.

File systems organize data into files, with each file representative of a number of blocks of constant size, and each block representative of a continuous set of bytes. In compression enabled file systems, a compression group represents a constant number of adjacent blocks in a file. Compression of data is usually performed by compressing a number of raw blocks, referred to herein as a compression group or zip group, into a fewer number of compressed blocks. Different data files are known to have different compression rates. With a fixed size compression group size, some compression groups may have all of their blocks full with the compressed data utilizing the entirety of the allotted storage space, while other compression groups may have blocks that are only partially filled with compressed data, resulting in compression loss. Accordingly, in a fixed size compression group the maximum attainable compression ratio is limited by the compression group size.

Prior art solutions to mitigate compression loss include using smaller data blocks so that the impact of a partially used last block in a compression group has a minimal impact. Another prior art solution to mitigate compression loss is to allocate more space to the compression group, i.e. larger compression groups. This solution is beneficial for highly compressible file. However, the prior art solutions interfere with other aspects of file system functionality, including, but not limited to, overall throughput and speed of random access.

SUMMARY

This invention comprises a method, computer program product, and system for managing compressed data to optimize file compression.

According to one aspect, a method is provided for managing compressed data. A first compression is performed on a first set of data to create first compressed data. The first compressed data is stored in one or more blocks of a first compression group. A size of free space of a last block of the first compression group is discovered and calculated. A second compression is performed on a second set of data to create second compressed data. At least a portion of the second compressed data is supplied to the first compression group for padding into the last block in response to determining that the size of the free space is sufficient. An unpadded portion of the second compressed data is stored in one or more blocks of a second compression group.

According to another aspect, a computer program product is provided to manage compressed data. A first compression is performed on a first set of data to create first compressed data. The first compressed data is stored in one or more blocks of a first compression group. A size of free space of a last block of the first compression group is discovered and calculated. A second compression is performed on a second set of data to create second compressed data. At least a portion of the second compressed data is supplied to the first compression group for padding into the last block in response to determining that the size of the free space is sufficient. An unpadded portion of the second compressed data is stored in one or more blocks of a second compression group.

According to yet another aspect, a system is provided to manage compressed data. A processing unit is in communication with memory. A functional unit is in communication with the processing unit. The functional unit performs a first compression on a first set of data to create first compressed data and stores the first compressed data in one or more blocks of a first compression group. The functional unit discovers and calculates a size of free space of a last block of the first compression group. The function unit performs a second compression on a second set of data to create second compressed data. The function unit supplies at least a portion of the second compressed data to the first compression group for padding into the last block in response to determining that the size of the free space is sufficient. The functional unit stores an unpadded portion of the second compressed data in one or more blocks of a second compression group.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
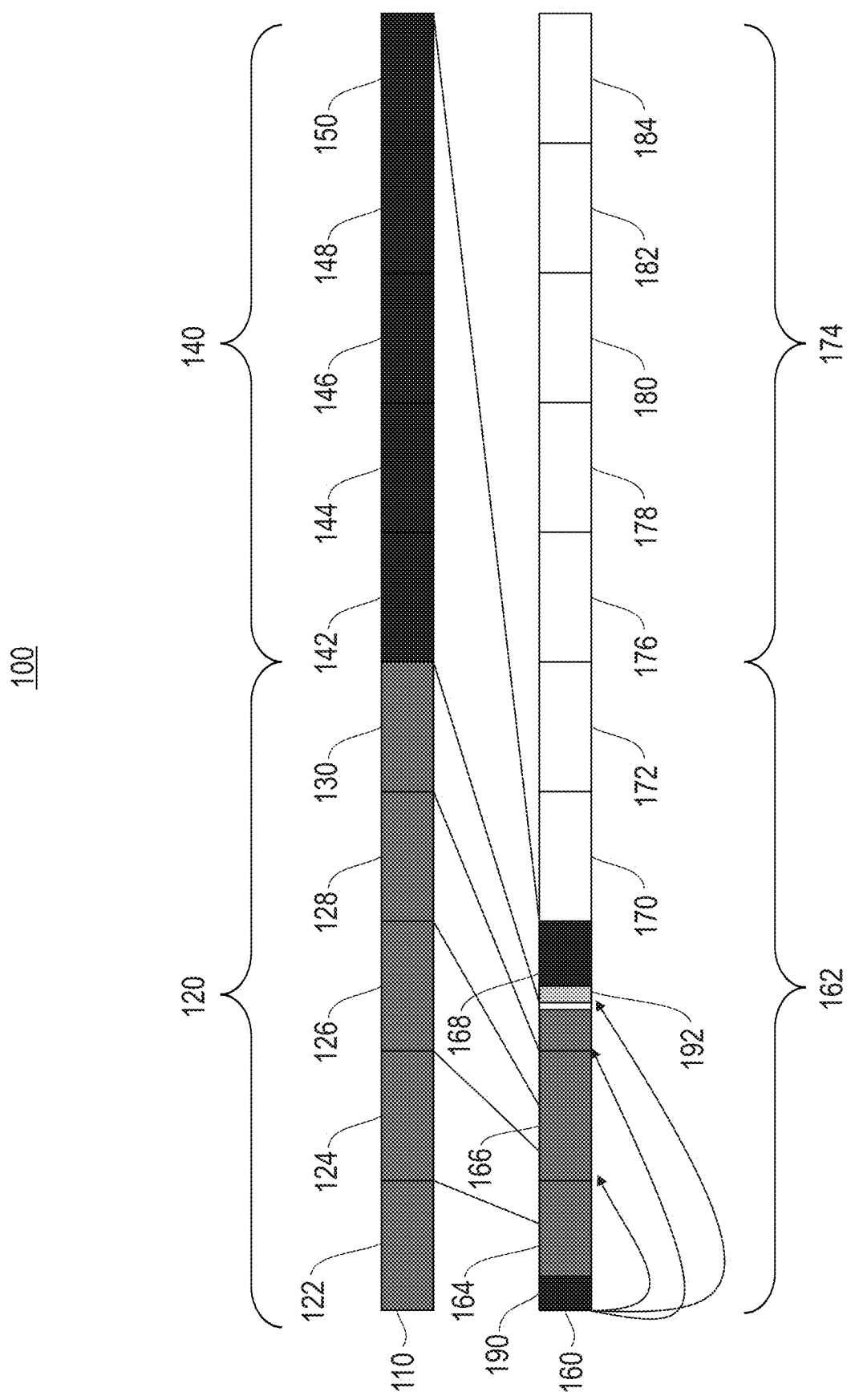
FIG. 1 depicts a block diagram illustrating a view of a relationship between raw data and compressed data.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers. A manager may be implemented in programmable hardware devices such as field programmable gate arrays, programmable array logic, programmable logic devices, or the like. The managers may also be implemented in software for processing by various types of processors. An identified manager of executable code may, for instance, comprise one or more physical or logical blocks of computer instructions which may, for instance, be organized as an object, procedure, function, or other construct. Nevertheless, the executables of an identified manager need not be physically located together, but may comprise disparate instructions stored in different locations which, when joined logically together, comprise the managers and achieve the stated purpose of the managers.

Indeed, a manager of executable code could be a single instruction, or many instructions, and may even be distributed over several different code segments, among different applications, and across several memory devices. Similarly, operational data may be identified and illustrated herein within the manager, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a topology manager, a hook manager, a storage topology manager, a resource utilization manager, an application manager, a director, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

In the following description of the embodiments, reference is made to the accompanying drawings that form a part hereof, and which shows by way of illustration the specific embodiment in which the invention may be practiced. It is to be understood that other embodiments may be utilized because structural changes may be made without departing from the scope of the present invention.

It is understood that a data block is a contiguous set of bits or bytes that form an identifiable unit of data. A partition is referred to herein as a continuous set of bytes within the data block, with the partition being a subset of the data block. Compression of raw data, e.g. uncompressed data, is performed on a partition basis. A compressed group is referred to herein as a set of adjacent blocks containing compressed data. The first block in each compressed group contains a group header that includes a list of pointers to where each compressed partition is stored inside the compressed group. Compression of data in relatively small partitions allows flexibility for moving compressed partitions without compressing or re-compressing. Metadata is stored in the compression group header and is used to track the location of the compressed partitions of an associated group emanating from a raw group of data within an uncompressed file. The headers and more specifically, the metadata stored in the headers may be updated to indicate the correct partition location for the compressed partition data.

Data may have different characteristics leading to different aspects of compressibility. Referring to FIG. 1, a block diagram (100) is provided illustrating a view of a relationship between raw data and compressed data. As shown, raw data (110) is stored in uncompressed format, and in this example is separated into a plurality of groups (120) and (140), with each group of raw data having multiple partitions. Namely, $group_1$ (120) is shown with blocks (122), (124), (126), (128), and (130). Similarly, $group_2$ (140) is shown with blocks (142), (144), (146), (148), and (150). Although only two groups of raw data are shown herein, the quantity should not be considered limiting. In one embodiment, each block is a continuous set of bytes.

A compression group (160) is provided to organize the raw data (110). The compression group (160) is shown in this example with two separate compressed groupings (162) and (174), each grouping having a fixed size to receive and store compressed data. More specifically, the first compressed group (162) has five compression blocks (164), (166), (168), (170), and (172), and the second compressed group (174) has five compression blocks (176), (178), (180), (182), and (184).

In the example shown herein, uncompressed data from $group_1$ (120) is compressed and organized into compression groups. The first and second blocks (164) and (166) in their entirety, and part of the third blocks (168) stores compressed data from $group_1$ (120) and $group_2$ (140). In addition, a header (190) is shown in the first part of the first block (164). Details of the header are described in detail below. The third block (168) is only partially filled with data from $group_1$ (120). The remaining space in the third block (168) is shown herein to receive and store compressed data (120) that originates in the second group, $group_2$ (140). In this example, the data in $group_2$ (140) is demonstrated to be highly compressible and is shown to fit entirely within the third block (168). As shown, a header (192) is created and stored in the third block (168), with the header referencing the compressed data from $group_2$ (140) stored into the third block (168). Details of the header (192) are described in detail below.

Figure 2:
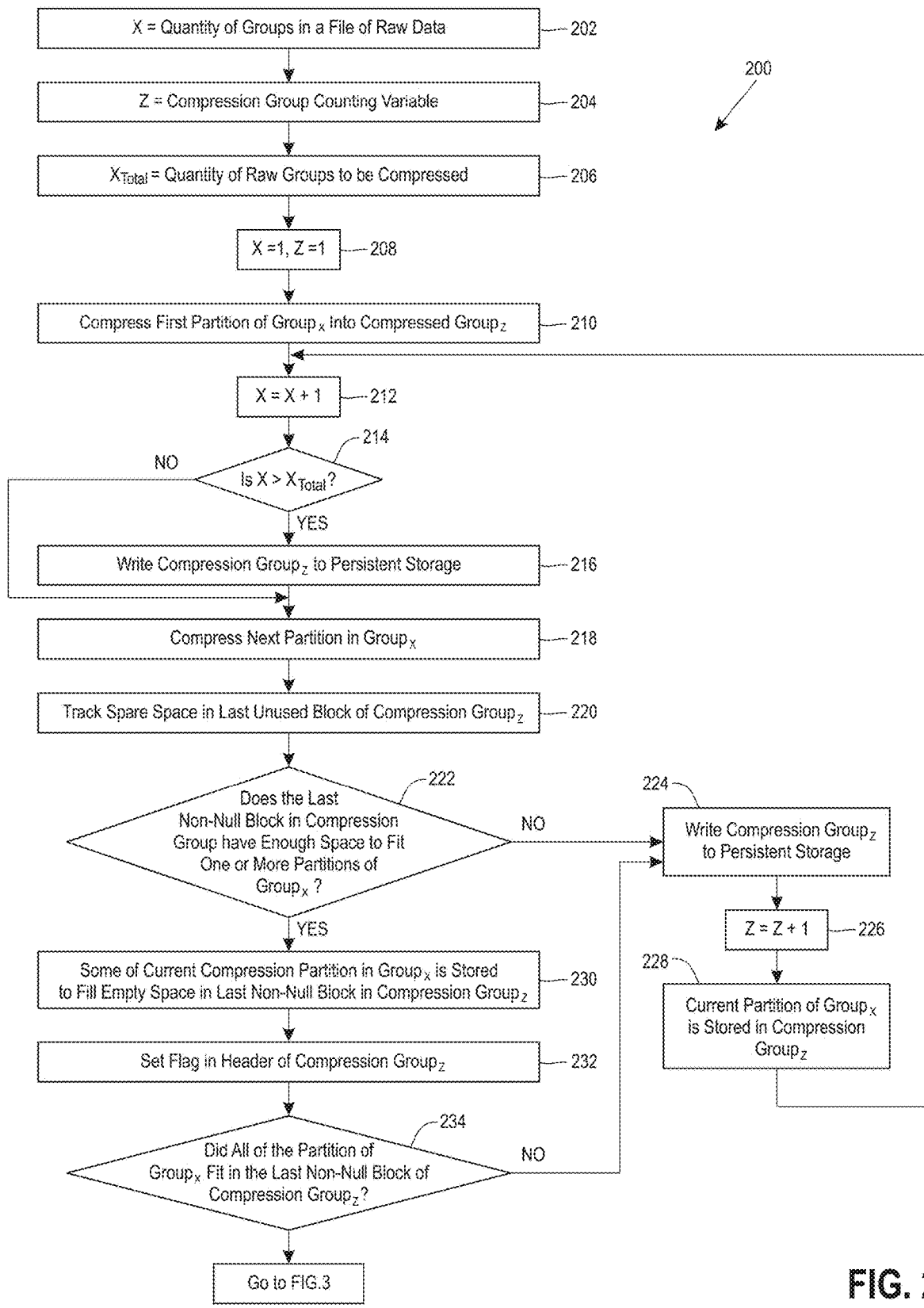
FIG. 2 depicts a flow chart illustrating a method for sequential compression of a file.

Referring to FIG. 2, a flow chart (200) is provided illustrating a method for sequential compression of a file. When compressing raw data, two or more blocks of raw data, e.g. uncompressed data within a group of a file, may be stored in a compression group to mitigate unused space in compression space. In one embodiment, each block in a group may be separated into multiple partitions, with the compression within a block taking place on a partition basis. For descriptive purposes, the sequential compression algorithm will separately utilize the terms group, block, and partition. As demonstrated herein, the compression, and more specifically, the storage of compressed data uses fixed size compression groups. There are two variables in the compression process associated with raw data, a first variable X associated with the quantity of groups in a file of raw uncompressed data (202), and a second counting variable Z for counting compression groups (204). The quantity of raw groups of data to be compressed is assigned to the variable $X_{Total}$ (206), and both the counting variables X and Z are initialized at (208). In one embodiment, partitions of raw data are individually compressed into compression groups. Similarly, it is understood that compressed data occupies less storage space than raw uncompressed data. As such, the first group of raw data should be received and stored in the first compression group. At the same time, it is understood that different data have different compression ratios, and following compression of the first set of partitions in the first group, there may be space remaining in the first compression group, which in one embodiment, may be used to store data from another group of data to be compressed. In one embodiment, the empty space in a compression group is found in the last partially filled block.

As noted herein, partitions of $group_X$ are compressed into $compression\ group_Z$ (210). Following compression and storage of the first partition into the first compression group, the raw uncompressed data group counting variable is incremented (212). It is then determined if there are additional groups of raw data subject to compression (214). An affirmative response to the determination at step (214) is following by writing the compression group, $group_Z$, to persistent storage (216), and conclusion of the sequential compression process. Accordingly, once the final group of raw data has been compressed into a compression group, the compression group is written to persistent storage.

However, if the response to the determination at step (214) is non-affirmative, the compression process continues. Namely, the next partition of the raw data, $group_X$, is compressed (218). In addition, any spare space remaining in the last used block of $compression\ group_Z$ is tracked (220). This tracking is employed to ensure that space in the compressed data arena is not wasted. Tracking empty space enables the compression group to be padded with data from two or more compressed partition groups of compressed raw data. As such, following step (220), it is determined if the last non-null block in the compression group space has enough spare space to fit one or more partitions of compressed partition $group_X$ (222). A non-affirmative response is followed by writing $compression\ group_Z$ to persistent storage (224) and incrementing the compression group counting variable Z (226). The current partition of raw data, $group_X$, is stored in the next compression group, $group_Z$ (228), followed by a return to step (212). Accordingly, as each $compression\ group_Z$ reaches capacity, the group is written to persistent storage, and a new compression group is created to receive the compressed partition data from $group_X$.

An affirmative response to the determination at step (222) is an indication that the current partition data may be stored in an open compression group that also stores data from a prior partition in $group_X$. As such, the current compression partition in $group_X$ is stored to fill as much empty space in the last non-null block in $compression\ group_Z$ (230). In addition, in order to track the location of compressed data with a compression group storing more than one compressed partition, a header entry is created for the stored partition in $group_X$, with the header entry stored in the last non-null block in $compression\ group_Z$. Following the creation of the header, a flag is set in the header of the $compression\ group_Z$ to indicate that $compression\ group_Z$ holds partitions belonging to at least one other file group (232). Accordingly, as shown, two headers are created in the partition group, with one header adjacent to and preceding the partition group stored in the compression group, and one header at the start of the compression group.

Following step (232), it is determined if all of the partitions of $group_X$ fit in the last non-null block of $compression\ group_Z$ (234). In one embodiment, the last outstanding partition of $group_X$ may be stored in $compression\ group_Z$, but there may be one or more additional partitions in $group_X$ that will need to be stored in a different compression group due to size constraints and/or compression ratios. A non-affirmative response to the determination at step (236) is followed by a return to step (224). Conversely, an affirmative response to the determination at step (234) is an indication of highly compressible data, as shown and described in FIG. 3.

Figure 3:
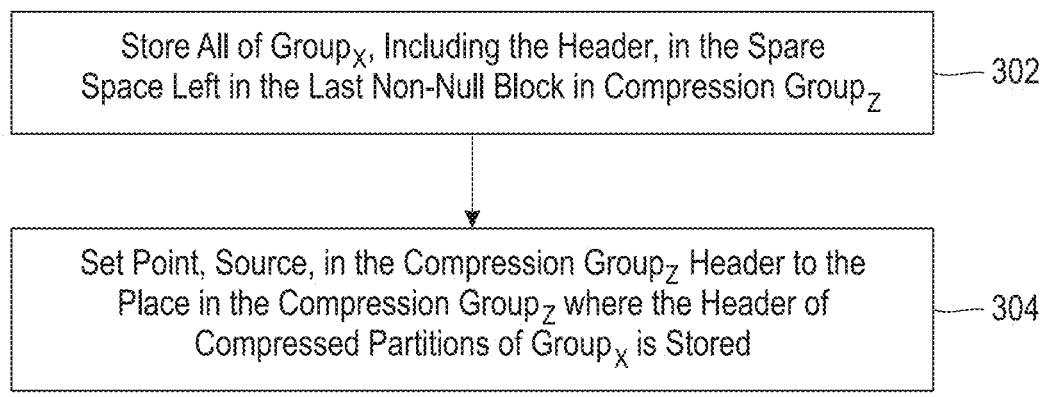
FIG. 3 depicts a flow chart illustrating a method for sequential compression of a file.

Referring to FIG. 3, a flow chart (300) is provided illustrating a process of compressing highly compressible data from a group of partitions into one or more compression groups. An affirmative response to the determination at step (230) is followed by storing the entire $group_x$, including the header, in the spare space left in the last non-null block in $compression\ group_z$ (302). In addition, a pointer, $source_p$, is set in the compression group header to point to the place in $compression\ group_z$ where the header of compressed partitions of $group_x$ is stored (306). Once the headers and pointer(s) are set, the process returns to step (212) to begin the process of storing the next partition in $group_x$.

The data compression shown and described in FIGS. 2 and 3 demonstrates compression of one or more partitions of raw data in a data group into one more compression groups. It is understood that a file of raw data may be separated into multiple data groups, with each data group having one or more partitions. The compression process may be extrapolated to continue the compression of raw data in the file to compression of multiple groups in the raw data file. In one embodiment, the compressed groups together with the associated metadata are atomically written to persistent storage. Similarly, in one embodiment, each group of compressed data may be individually written to persistent storage as the group is complete. In another embodiment, two or more compressed groups may be bound together, and written to data storage as a bounded group. Accordingly, as shown in FIGS. 2 and 3, data is compressed and stored in data groups, with one or more headers tracking the location of the compressed data within the compression groups.

Figure 4:
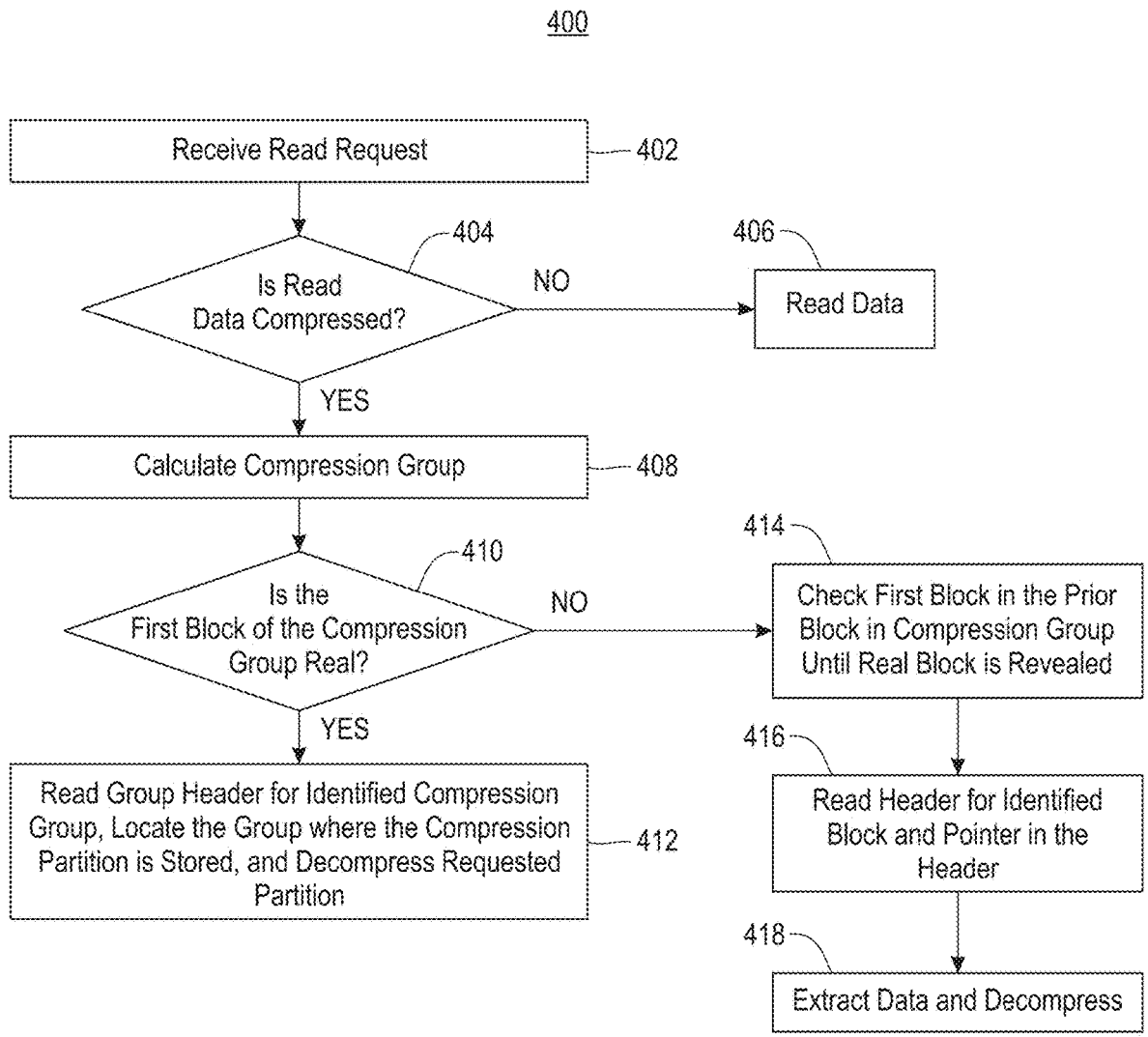
FIG. 4 depicts a flow chart illustrating a method for randomly reading a set of data from one or more compression groups.

Compressed data may be accessed to support a read request. Referring to FIG. 4, a flow chart (400) is provided illustrating a process for randomly reading a set of data from one or more compression groups. As shown, a request to read data is received (402). The read request includes the address of the first byte of data in the file and a length of bytes to be read. The read request does not have knowledge of data compression. The data in support of the read request may be raw, e.g. uncompressed, or compressed. Raw data may be read without further processing. However, compressed data must be decompressed in order to support the read request. Based on the parameters of the read request, it is determined if the data to be read is compressed data (404). If the data is in a raw format, the data is read and the process concludes (406).

If at step (404) it is determined that the data is compressed, a de-compression process takes place. The compression group for the read request data is calculated from the address and the length that accompanied the request (408). It is then determined if the first block of a compression group is real, i.e. non-NULL (410). An affirmative response to the determination at step (410) is followed by reading the group header for the identified group, locating the group where the requested partition(s) is stored, and the requested partition(s) is decompressed (412). However, a non-affirmative response to the determination at step (410) is followed by checking the first block in the prior compression group, and continuing to sequentially search each first block in the prior block in the compression groups until a real first block is revealed (414). Thereafter, the header for the identified real block is read, and more specifically, the pointer in the header is identified to ascertain the location where the foreign group(s) is stored in the compression group (416). The data is then extracted and decompressed to support the read request (418).

Figure 5:
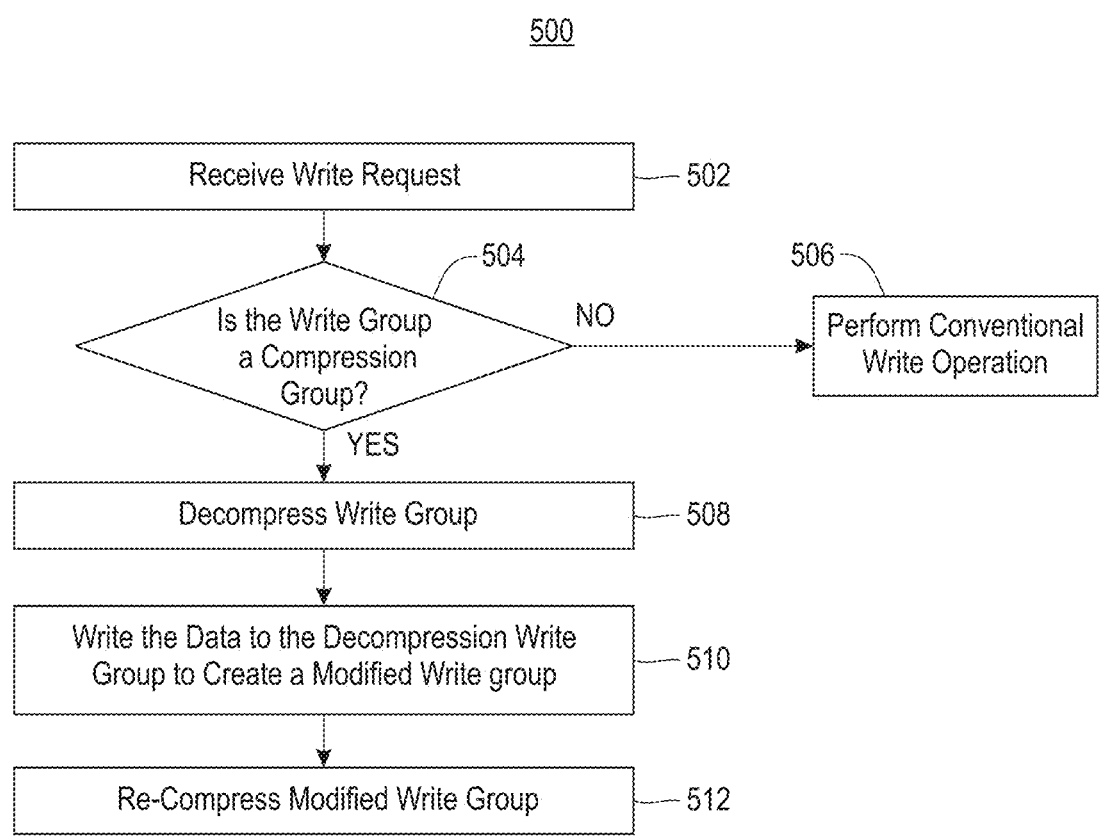
FIG. 5 depicts a flow chart illustrating a method for randomly writing a set of data into one or more compression groups.

Compressed data may also be accessed to support a write request. Referring to FIG. 5, a flow chart (500) is provided illustrating a process for writing a set of data into one or more compression groups. As shown, a request to write a set of data is received (502). The write request includes an address for performing the write transaction. The write request does not have knowledge of data compression. The write address may point to a location within a group of data, hereinafter referred to as a write group. It is determined if the write group is a compression group (504). A negative response to the determination at step (504) results in the performance of a conventional write operation (506), and the process concludes.

An affirmative response to the determination at step (504) means that the write group contains compressed data, and in some embodiments the write group is decompressed (508). The write transaction then takes place by writing the data to the decompressed write group to create a modified write group (510). The modified write group is then recompressed (512). Accordingly, in order to satisfy a write request, a compression group is decompressed prior to writing data content to a location within the compression group, and in some embodiments the compression group with the written data content is then recompressed.

When a heterogeneous write group is decompressed, as in (508), the foreign partitions that it may hold should be stored in their owning group because after decompression there will no longer be spare space in the write group. In case the owning group is also heterogeneous its foreign partitions may need to be moved to make space for its own partitions received from the write group. To bound this chain of partitions movements when decompressing a group as in (508), a threshold of maximum number of adjacent groups sharing partitions can be imposed when compressing a file. This insures that some compressed groups do not contain partitions belonging to others, so no forwarding of partitions is needed when they are decompressed.

Figure 6:
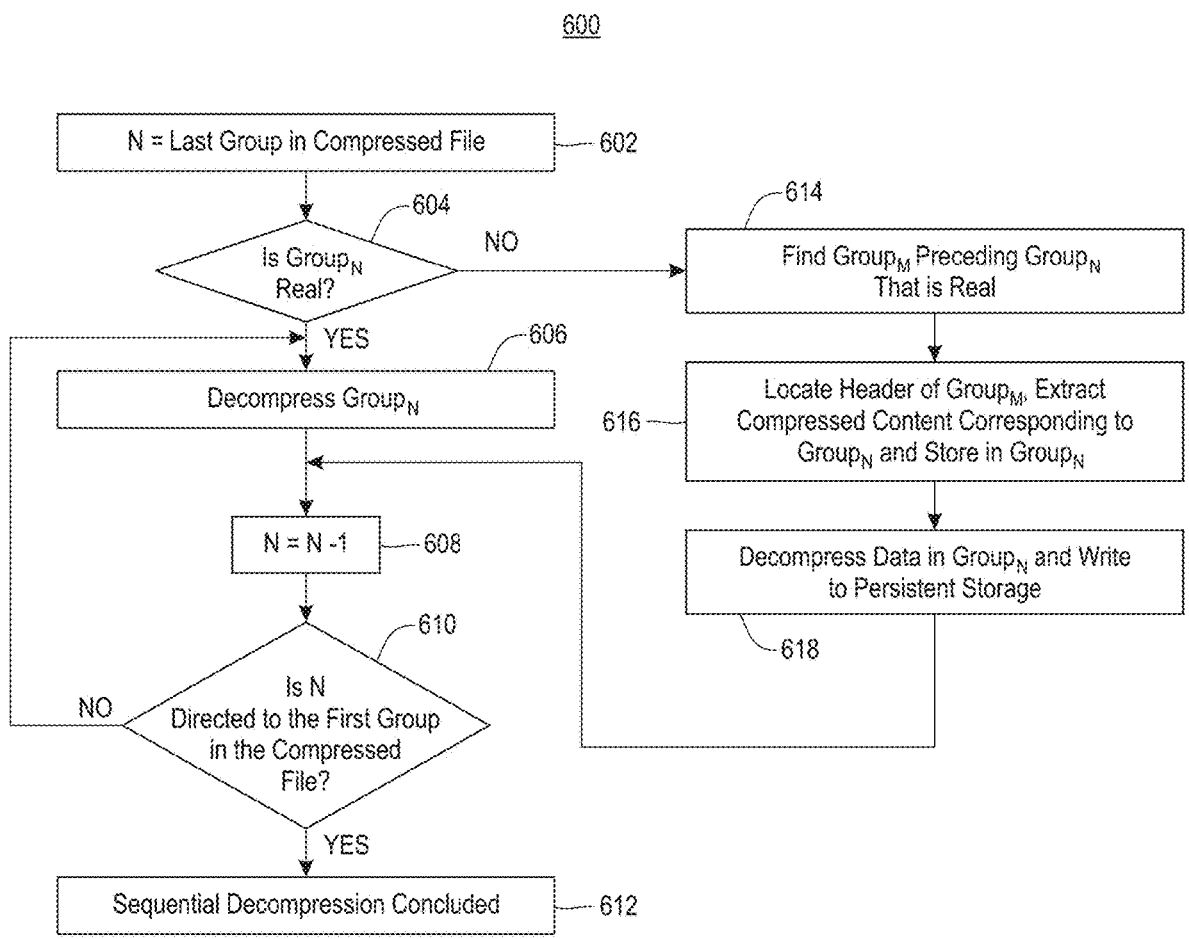
FIG. 6 depicts a flow chart illustrating a method for sequential de-compression of a file.

As shown in FIGS. 2 and 3, data may be sequentially compressed and stored, and the stored data may support a random read or write request. As discussed above, supporting a read or write request with respect to compressed data includes compressed data decompression. Referring to FIG. 6, a flow chart (600) is provided illustrating a process demonstrating sequential de-compression of a file. The variable N is assigned to the last group in a compressed file (602), and it is determined if the group, $group_N$, is real (604). An affirmative response to the determination at step (604) is followed by decompressing the group, $group_N$, eventually using the partitions stored in $group_{N-1}$, and writing the decompressed data blocks to persistent storage (606). Following step (606), the group counting variable, N, is decreased (608), and it is determined if the group counting variable is directed to the first group in the compressed file (610). An affirmative response to the determination concludes the sequential decompression (612). However, a non-affirmative response to the determination at step (610) is followed by a return to step (606). Accordingly, for each real group of data within the compression group, the data is sequentially decompressed and written to persistent storage.

Returning to step (606), a non-affirmative response to the determination is following by find a group, $group_M$, preceding $group_N$ that is real (614). In the header of $group_M$, the pointer to where the foreign compressed groups are stored is located, and the compressed content corresponding to $group_N$ is extracted and stored in $group_N$ (616). Thereafter, the data in $group_N$ is decompressed and written to persistent storage (618), followed by a return to step (608). Accordingly, as shown in steps (614)-(618), the appropriate located data is found and subject to sequential decompression.

Figure 7:
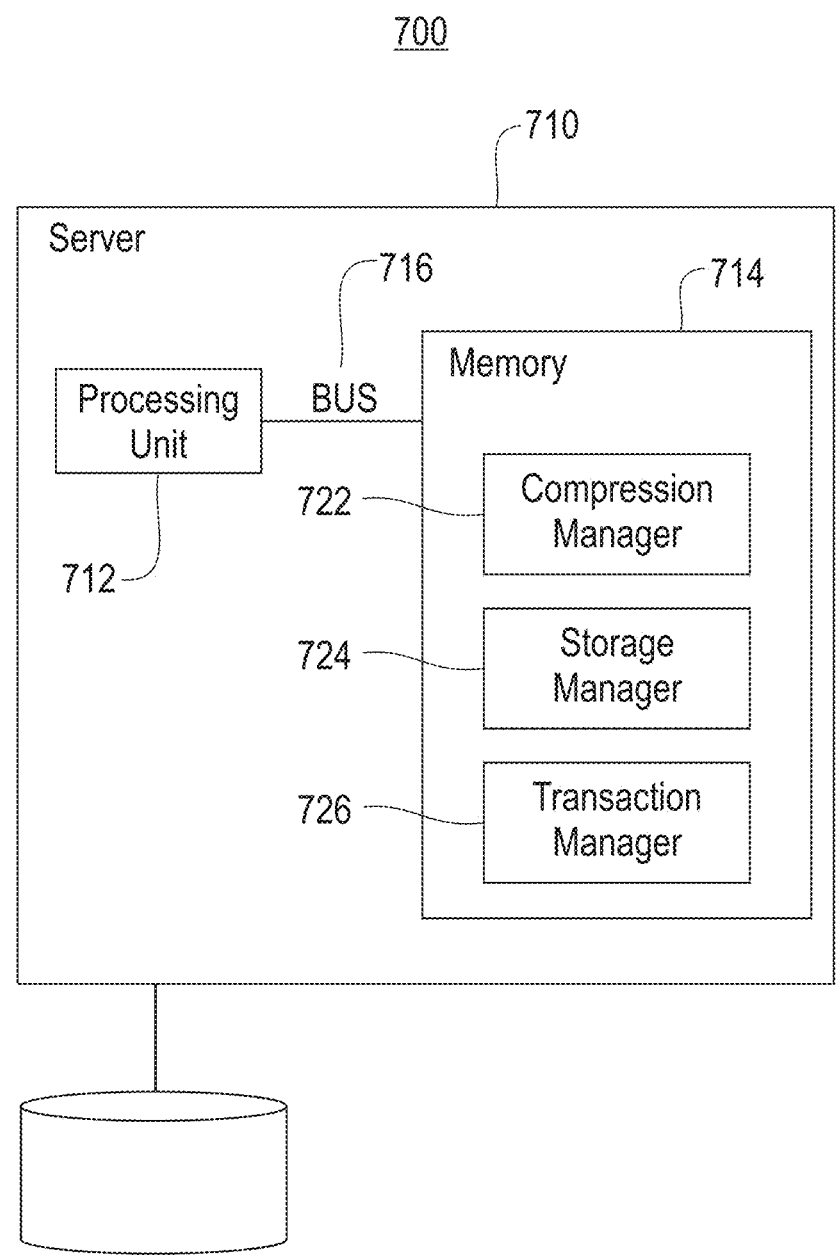
FIG. 7 depicts a block diagram illustrating tools embedded in a computer system to support efficient allocation and reclamation of storage.

As shown in FIGS. 2-6, methods are provided to demonstrate processes for data compression, de-compression, and support of a read or write transaction request. With reference to FIG. 7, a block diagram (700) is provided illustrating a data storage system for performing the processes described above in FIGS. 2-6. The data storage system may run on one or more servers (710) that include a processing unit (712) in communication with memory (714) across a bus (716).

A set of tools are provided in communication with the processing unit (712) to support data compression, including management of both data compression associated with data storage, and reading and writing the compressed data. In one embodiment, the tools include: a compression manager (722), a storage manager (724), and a transaction manager (726). The compression manager (722) is provided to perform compression on raw data, the storage manager (724) is provided to store compressed data in one or more blocks of a compression group, and the transaction manager (726) is provided to satisfy a write transaction or a read transaction requiring one or more compressed data storage blocks.

The compression manager (722) performs a first compression on a first set of data to create first compressed data, and the storage manager (724) stores the first compressed data in one or more blocks of a first compression group. The compression manager (722) and/or the storage manager (724) discovers and calculates a size of free space of a last block of the first compression group, and the compression manager (722) performs a second compression on a second set of data to create second compressed data. In one embodiment, the first and second compressions are performed sequentially.

The storage manager (724) decides where to store the second compressed data based on the calculated size of free space remaining in the last block of the first compression group. If it is determined that the size of the free space is sufficient, the storage manager (724) pads at least a portion of the second compressed data into the last block of the first compression group, and will store any remaining unpadded portion of the second compressed data in one or more blocks of a second compression group. In one embodiment, tracking free space remaining in a compression group includes comparing the size of the free space to a threshold, and the second compressed data is padded in the last block if the size of the free space exceeds the threshold. Accordingly, the compression manager (722) compresses data, while the storage manager (724) determines where the data compressed by the compression manager should be stored based on an amount of free space left in a previously compressed group of data.

In one embodiment, the storage manager (724) atomically writes the first compressed data and first metadata associated with the first compression group, and atomically writes the second compressed data and second metadata associated with the second compression group. The first and second metadata may comprise respective headers for mapping data to locations of corresponding compressed data. In one embodiment, the first metadata is updated by the storage manager (724) when the second compressed data is padded in the free space of the first compression group. This may include setting a flag to indicate the presence of the padded data within the first compression group. In one embodiment, if the entirety of the second compressed data is padded into the first compression group, the storage manager (724) may set a pointer in the first header to point to a location of the second header within the last block, and replace the one or more second blocks with ZNULL blocks.

As discussed above, the transaction manager (726) is provided to satisfy read transaction requests and write transaction requests requiring one or more compressed data storage blocks. In response to a read/write request having a read/write address, the transaction manager (726) locates a read/write group based on the read/write address. The transaction manager (726) decompresses the read/write group. In one embodiment, prior to the decompression, the transaction manager (726) determines if the located group is heterogeneous (i.e., contains compressed data corresponding to another compression group), and converts the heterogeneous group to a homogeneous group. For example, if the transaction manager (726) determines that the located group is heterogeneous, the heterogeneous group may be converted to a homogeneous group by moving the compressed data to its source compression group. In the case of a read transaction, the transaction manager (726) reads the decompressed data associated with the read address. In the case of a write transaction, the transaction manager (726) writes data to the decompressed write group to create a modified write group. Accordingly, the transaction manager (726) is provided to satisfy read and write transactions involving compressed data.

As identified above, the compression manager (722), storage manager (724), and transaction manager (726), hereinafter referred to as tools, function as elements to support data compression. The tools (722)-(726) are shown in the embodiment of FIG. 7 as residing in memory (714) local to the data storage system (610). However, in alternative embodiments, the tools (722)-(726) may reside as hardware tools external to the memory (720), or they may be implemented as a combination of hardware and software. Similarly, in one embodiment, the tools (722)-(726) may be combined into a single functional item that incorporates the functionality of the separate items. As shown herein, each of the tools (722)-(726) are shown local to the data storage server (710). However, in one embodiment they may be collectively or individually distributed across a network or multiple machines and function as a unit to support data compression. Accordingly, the tools may be implemented as software tools, hardware tools, or a combination of software and hardware tools.

Figure 8:
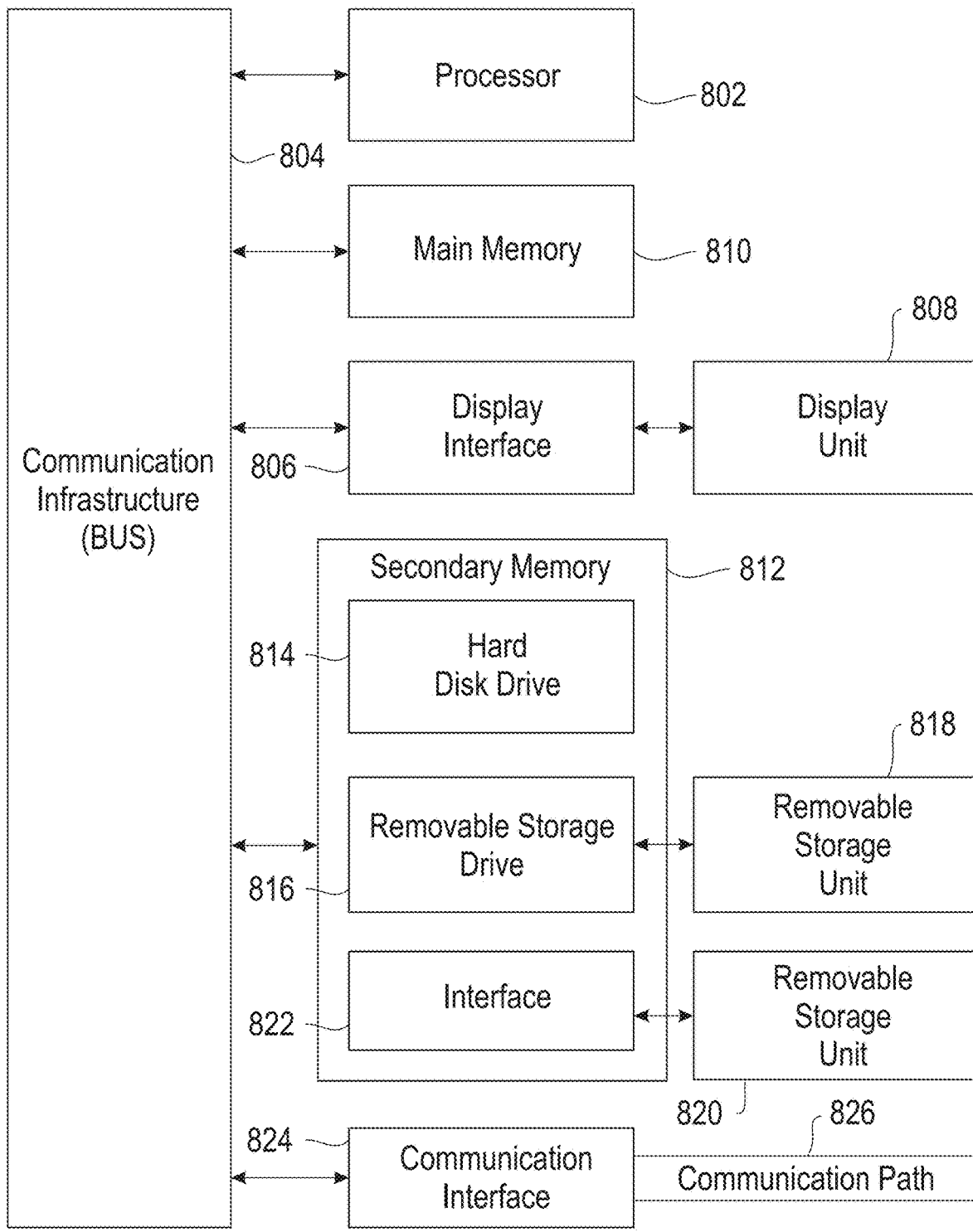
FIG. 8 depicts a block diagram showing a system for implementing the tools of FIG. 7.

With reference to FIG. 8, a block diagram (800) is provided illustrating an exemplary system for implementing the data compression and storage, as shown and described in the flow charts of FIGS. 2-6. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816). As will be appreciated, the removable storage unit (818) includes a computer readable medium having stored therein computer software and/or data.

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present embodiments as discussed herein. In particular, the computer programs, when run, enable the processor (802) to perform the features of the computer system. Accordingly, such computer programs represent controllers of the computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It will be appreciated that, although specific embodiments of the invention have been described herein for purposes of illustration, various modifications may be made without departing from the spirit and scope of the invention. Accordingly, the scope of protection of this invention is limited only by the following claims and their equivalents.

We claim:

1. A method comprising:
providing raw data stored in an uncompressed format, the raw data being separated into a plurality of uncompressed groups, including at least a first uncompressed group and a second uncompressed group, the first uncompressed group including a plurality of first data blocks, at least a first data block of the first plurality of data blocks comprising a plurality of first partitions of a continuous set of bytes of data stored in uncompressed format, the second uncompressed group including a plurality of second data blocks, at least a second data block of the second plurality of data blocks comprising a plurality of second partitions of a continuous set of bytes of data stored in uncompressed format;
performing a first compression on the first data blocks to create first compressed data;
storing the first compressed data in one or more fixed-size first compression blocks, the storing comprising partially filling a last used compression block of the one or more first compression blocks with the first compressed data to leave free space in the last used first compression block;
discovering and calculating a size of the free space of the partially filled last used first compression;
performing at least a second compression on the second data blocks to create second compressed data, the second compression being performed on a partition basis;
storing a first subset of one or more compressed partitions of the second compressed data into the free space of the partially filled last used first compression block; and
after the storing of the first subset, storing a second subset of one or more compressed partitions of the second compressed data in one or more fixed-size second compression blocks while maintaining the first compressed data and the first subset of the second compressed data resident within the one or more first compression blocks.

2. The method of claim 1, wherein the first and second compressions are performed sequentially.

3. The method of claim 1, wherein the discovering and calculating further comprises determining that the size of the free space is sufficient for storing the first subset of one or more compressed partitions of the second compressed data, including comparing the size of the free space to a threshold, and wherein the storing the first subset of one or more compressed partitions of the second compressed data is in response to the size of the free space exceeding the threshold.

4. The method of claim 1, further comprising:
atomically writing the first compressed data and first metadata associated with a first compression group, the first compression group including the one or more first compression blocks, wherein the first metadata comprises a first header mapping data of the first data blocks to respective locations of the first compressed data; and
atomically writing the second compressed data and second metadata associated with a second compression group, the second compression group including the one or more second compression blocks, wherein the second metadata comprises a second header mapping data of the second data blocks to respective locations of the second compressed data.

5. The method of claim 4, wherein the first metadata is updated in response to the storing the first subset of one or more compressed partitions of the second compressed data into the free space of the partially filled last used first compression block, including setting a first flag indicating the presence of the first subset of one or more compressed partitions of the second compressed data into the free space of the last used first compression.

6. The method of claim 1, further comprising:
in response to a read request comprising a read address and length, locating a read group based on the read address skipping any NULL groups until finding a real group, finding the relevant partitions to read in the real group, and decompressing these relevant partitions and returning data associated with the read address; and
in response to a write request comprising a write address, locating a write group based on the write address, decompressing the write group, writing data to the decompressed write group to create a modified write group, and recompressing the modified group.

7. The method of claim 6, further comprising determining that a located group is heterogeneous and for the write request converting the heterogeneous group to a homogeneous group prior to the decompression.

8. The method of claim 1, further comprising setting a threshold associated with a maximum quantity of adjacent groups sharing partitions, wherein the compressed data supplied for storing the first subset into the last used first compression block is limited by the threshold.

9. A computer program product comprising a computer readable storage medium having computer readable program code embodied therewith, the program code being executable by a processor to:
receive raw data stored in an uncompressed format, the raw data being separated into a plurality of uncompressed groups, including at least a first uncompressed group and a second uncompressed group, the first uncompressed group including a plurality of first data blocks, at least a first data block of the first plurality of data blocks comprising a plurality of first partitions of a continuous set of bytes of data stored in uncompressed format, the second uncompressed group including a plurality of second data blocks, at least a second data block of the second plurality of data blocks comprising a plurality of second partitions of a continuous set of bytes of data stored in uncompressed format;
perform a first compression on the first data blocks to create first compressed data;
store the first compressed data in one or more fixed-size first compression blocks, the store comprising partially filling a last used compression block of the one or more first compression blocks with the first compressed data to leave free space in the last used first compression block;

discover and calculate a size of the free space of the partially filled last used first compression;

perform at least a second compression on the second data blocks to create second compressed data, the second compression being performed on a partition basis;

store a first subset of one or more compressed partitions of the second compressed data into the free space of the partially filled last used first compression block; and after the store of the first subset, store a second subset of one or more compressed partitions of the second compressed data in one or more fixed-size second compression blocks while the first compressed data and the first subset of the second compressed data resident within the one or more first compression blocks is maintained.

10. The computer program product of claim 9, further comprising program code to determine that the amount of the free space is sufficient for storing the first subset of one or more compressed partitions of the second compressed data, including program code to compare the size of the free space to a threshold, and wherein the storing the first subset of one or more compressed partitions of the second compressed data is in response to the size of the free space exceeding the threshold.

11. The computer program product of claim 9, further comprising program code to:
atomically write the first compressed data and first metadata associated with a first compression group, the first compression group including the one or more first compression blocks, wherein the first metadata comprises a first header mapping data of the first data blocks to respective locations of the first compressed data; and
atomically write the second compressed data and second metadata associated with a second compression group, the second compression group including the one or more second compression blocks, wherein the second metadata comprises a second header mapping data of the second data blocks to respective locations of the second compressed data.

12. The computer program product of claim 11, wherein the first metadata is updated in response to the storing the first subset of one or more compressed partitions of the second compressed data into the free space of the partially filled last used first compression block, including program code to set a first flag indicating the presence of the first subset of one or more compressed partitions of the second compressed data into the free space of the last used first compression block.

13. The computer program product of claim 10, further comprising program code to:
in response to a read request comprising a read address and length, locate a read group based on the read address, skip any NULL groups until finding a real group, find relevant partitions to read in the real group, and decompress these relevant partitions and return data associated with the read address; and
in response to a write request comprising a write address, locate a write group based on the write address, decompress the write group, write data to the decompressed write group to create a modified write group, and recompress the modified group.

14. The computer program product of claim 9, further comprising program code to set a threshold associated with a maximum quantity of sets of data, wherein the compressed data supplied for storing the first subset into the last used first compression block is limited by the threshold.

15. A system comprising:
a processing unit in communication with memory;
a functional unit in communication the processing unit, the functional unit having one or more tools to support data compression, the functional unit to:
receive raw data stored in an uncompressed format, the raw data being separated into a plurality of uncompressed groups, including at least a first uncompressed group and a second uncompressed group, the first uncompressed group including a plurality of first data blocks, at least a first data block of the first plurality of data blocks comprising a plurality of first partitions of a continuous set of bytes of data stored in uncompressed format, the second uncompressed group including a plurality of second data blocks, at least a second data block of the second plurality of data blocks comprising a plurality of second partitions of a continuous set of bytes of data stored in uncompressed format;
perform a first compression on the first data blocks to create first compressed data;
store the first compressed data in one or more fixed-size first compression blocks, the store comprising partially filling a last used compression block of the one or more first compression blocks with the first compressed data to leave free space in the last used first compression block;
discover and calculate a size of the free space of the partially filled last used first compression;
perform at least a second compression on the second data blocks to create second compressed data, the second compression being performed on a partition basis;
store a first subset of one or more compressed partitions of the second compressed data into the free space of the partially filled last used first compression block; and
after the first subset is stored in the free space, store a second subset of one or more compressed partitions of the second compressed data in one or more fixed-size second compression blocks while the first compressed data and the first subset of the second compressed data resident within the one or more first compression blocks is maintained.

16. The system of claim 15, further comprising the functional unit to:
atomically write the first compressed data and first metadata associated with a first compression group, the first compression group including the one or more first compression blocks, wherein the first metadata comprises a first header mapping data of the first data blocks to respective locations of the first compressed data; and
atomically write the second compressed data and second metadata associated with a second compression group, the second compression group including the one or more second compression blocks, wherein the second metadata comprises a second header mapping data of the second data blocks to respective locations of the second compressed data.

17. The system of claim 15, further comprising the functional unit to:
set a first threshold associated with a minimum amount of free space;
determine that the amount of the free space is sufficient for storing the first subset of one or more compressed partitions of the second compressed data, including the functional unit to compare the size of the free space to the first threshold, and wherein the storing the first subset of one or more compressed partitions of the second compressed data is in response to the size of the free space exceeding the first threshold; and set a second threshold associated with a maximum quantity of sets of data, wherein the compressed data supplied for storing into the last used first compression block is limited by the second threshold.

18. The system of claim 15, further comprising the functional unit to:

in response to a read request comprising a read address and length, locate a read group based on the read address, skip any NULL groups until a real group is found, find relevant partitions to read in the real group, and decompressing these relevant partitions and return data associated with the read address; and in response to a write request comprising a write address, locate a write group based on the write address, decompressing the write group, writing data to the decompressed write group to create a modified write group, and recompressing the modified group.

19. The method of claim 1, wherein the first compressed data is decompressed while maintaining the first subset of one or more compressed partitions of the second compressed data, and further comprising writing the decompressed first compressed data and the decompressed first subset of one or more compressed partitions of the second compressed data to persistent storage.

20. The system of claim 15, wherein the first compressed data is decompressed while maintaining the first subset of one or more compressed partitions of the second compressed data, and further comprising writing the decompressed first compressed data and the decompressed first subset of one or more compressed partitions of the second compressed data to persistent storage.

* * * * *